US011657656B2

(12) United States Patent
Sandu et al.

(10) Patent No.: US 11,657,656 B2
(45) Date of Patent: May 23, 2023

(54) SMART VEHICLE TRAVEL PREPARATION AND LOCATION-BASED SERVICING FEATURES FOR MOBILE DEVICE TOOLS AND METHODS OF USE

(71) Applicant: Thor Tech, Inc., Elkhart, IN (US)

(72) Inventors: Ciprian R. Sandu, Coppell, TX (US); Jason T. Kriesel, Grand Prairie, TX (US); McKay R. Featherstone, Tipp City, OH (US); Edward Brady, Delaware, OH (US); Steven Hileman, Coldwater, OH (US)

(73) Assignee: Thor Tech, Inc., Elkhart, IN (US)

( * ) Notice: Subject to any disclaimer, the term of this patent is extended or adjusted under 35 U.S.C. 154(b) by 359 days.

(21) Appl. No.: 16/751,758

(22) Filed: Jan. 24, 2020

(65) Prior Publication Data

US 2020/0242855 A1    Jul. 30, 2020

Related U.S. Application Data

(60) Provisional application No. 62/796,686, filed on Jan. 25, 2019.

(51) Int. Cl.
*G07C 5/00* (2006.01)
*G07C 5/08* (2006.01)
(Continued)

(52) U.S. Cl.
CPC ........... *G07C 5/008* (2013.01); *G07C 5/0825* (2013.01); *G16Y 20/10* (2020.01); *G16Y 40/10* (2020.01); *G16Y 40/30* (2020.01); *H04W 4/40* (2018.02)

(58) Field of Classification Search
None
See application file for complete search history.

(56) References Cited

U.S. PATENT DOCUMENTS 9,444,860 B1 * 9/2016 Jammula .......... G06Q 10/06316
10,366,436 B1 * 7/2019 Kumar ................. G06Q 10/087
(Continued)

FOREIGN PATENT DOCUMENTS

| KR | 101859358 B1 * | 5/2018 |
| KR | 101933493 B1 | 12/2018 |
| WO | 2017106224 A1 | 6/2017 |

OTHER PUBLICATIONS

"CaraControl | Ultimate RV Smart Home Solution" CaraControl, dated Aug. 25, 2018 <https://www.youtube.com/watch?v=btl7hUknDKU> (Year: 2018).*

(Continued)

*Primary Examiner* — Anne Marie Antonucci
*Assistant Examiner* — Kyle S Park
(74) *Attorney, Agent, or Firm* — Dinsmore & Shohl LLP

(57) ABSTRACT

Control methods and systems including a smart vehicle, a smart mobile device including a processor, a memory communicatively coupled to the processor, and machine readable instructions stored in the memory that may cause a system to perform at least the following when executed by the processor: use a software application tool of the smart mobile device to automatically control and monitor functionality of an internet of things (IOT) environment of the smart vehicle and to identify the smart vehicle type; autopopulate the software application tool with dynamic checklists based on the smart vehicle details; and utilize and/or modify the dynamic checklists during vehicle preparation, travel, and/or servicing based on dynamic IOT control features.

20 Claims, 12 Drawing Sheets

(51) Int. Cl.
*G16Y 40/30* (2020.01)
*G16Y 40/10* (2020.01)
*G16Y 20/10* (2020.01)
*H04W 4/40* (2018.01)

(56) References Cited

U.S. PATENT DOCUMENTS

| | | |
|---|---|---|
| 2014/0095012 A1* | 4/2014 | Wischmeyer .......... B64D 43/00 701/29.1 |
| 2016/0197772 A1 | 7/2016 | Britt et al. |
| 2016/0297398 A1 | 10/2016 | Jefferies |
| 2017/0178035 A1 | 6/2017 | Grimm |
| 2017/0366969 A1 | 12/2017 | Syed |
| 2018/0108194 A1 | 4/2018 | Link, II |
| 2018/0154874 A1 | 6/2018 | Kulkarni et al. |
| 2018/0367329 A1 | 12/2018 | Shin |
| 2019/0020718 A1 | 1/2019 | Mathews et al. |
| 2019/0204097 A1* | 7/2019 | Starns ................... G05D 1/0088 |
| 2019/0360825 A1* | 11/2019 | Wang ..................... H04W 4/40 |
| 2020/0050199 A1* | 2/2020 | Park ....................... G06Q 50/28 |

OTHER PUBLICATIONS

Machine translation of KR 101859358 B1 (Year: 2018).*
International Search Report and Written Opinion dated Apr. 9, 2020 pertaining to International application No. PCT/US2020/014944 filed Jan. 24, 2020, 17 pgs.
International Search Report and Written Opinion dated Jun. 23, 2020 pertaining to International application No. PCT/US2020/014970 filed Jan. 24, 2020, 22 pgs.
International Search Report and Written Opinion dated Apr. 9, 2020 relating to International Application No. PCT/US/2020/014880.

* cited by examiner

Campsite Departure

Onto the next stop or heading home?
We've got it covered.

Start checklist

Control　　Monitor　　Locate　　Checklist　　More

SMART VEHICLE TRAVEL PREPARATION AND LOCATION-BASED SERVICING FEATURES FOR MOBILE DEVICE TOOLS AND METHODS OF USE

CROSS REFERENCE TO RELATED APPLICATIONS

This application claims the benefit of U.S. Provisional Application Ser. No. 62/796,686 (AIR 1005 MA), filed Jan. 25, 2019, the entire contents of which are incorporated by reference.

TECHNICAL FIELD

The present specification generally relates to systems to control a smart vehicle and, more specifically, to systems for smart vehicle travel preparation and location-based servicing with a smart mobile device paired with the smart vehicle and methods of use of such systems.

BACKGROUND

Static checklists may be prepared and used for road travel. However, such checklists may be improved for road travel of a smart vehicle.

Accordingly, a need exists for alternative systems for travel preparation and servicing features for smart vehicle road travel and methods of use of such systems.

BRIEF SUMMARY

In one embodiment, a smart mobile device comprises a user interface and a user interface controller. The user interface comprises a display, and the user interface controller is configured to receive vehicle feature state indications from a smart vehicle. The smart vehicle comprises an Internet of Things (IOT) controller, and the IOT controller configured to acquire and monitor data from vehicle IOT devices to generate the vehicle feature state indications. The user interface controller comprises a processor and non-transitory computer readable storage comprising instructions that, when executed by the processor, cause the user interface controller to cooperate with the IOT controller and the user interface to: receive a first vehicle property that includes a vehicle configuration, a first vehicle feature state indication from the smart vehicle, or both, and receive a context indication via the user interface. The context indication is representative of an activity context for the first vehicle property. The instructions further cause the user interface controller to generate a checklist comprising one or more first tasks based on the first vehicle property and the activity context, display the checklist at the display, receive a second vehicle feature state indication from the smart vehicle, and generate a modified checklist including a checklist modification based on the second vehicle feature state indication. The checklist modification comprises an addition to the checklist of one or more second tasks based on the second vehicle feature state indication, a modification of at least one of the one or more first tasks, a removal of at least one of the one or more first tasks, or combinations thereof. The instructions further cause the user interface controller to display the modified checklist at the display.

In another embodiment, a smart mobile device comprises a user interface and a user interface controller. The user interface comprises a display, and the user interface controller is configured to receive vehicle feature state indications from a smart vehicle. The smart vehicle comprises an Internet of Things (IOT) controller, and the IOT controller is configured to acquire and monitor data from vehicle IOT devices to generate the vehicle feature state indications. The user interface controller comprises a processor and non-transitory computer readable storage comprising instructions that, when executed by the processor, cause the user interface controller to cooperate with the IOT controller and the user interface to: determine a vehicle location of the smart vehicle, receive a vehicle feature state indication from the IOT controller of a state of a vehicle feature to service of the smart vehicle, and determine whether the vehicle feature state indication meets at least one servicing threshold. The instructions further cause the user interface controller to identify one or more servicing providers suitable to service the vehicle feature based on the state of the vehicle feature to service and the vehicle location when the vehicle feature state indication meets the at least one servicing threshold. The one or more servicing providers are located within a predetermined proximity of the vehicle location. The instructions further cause the user interface controller to display the one or more servicing providers on the display.

In yet another embodiment, a smart mobile device comprises a user interface and a user interface controller. The user interface comprises a display, and the user interface controller is configured to receive vehicle feature state indications from a smart vehicle. The smart vehicle comprises an Internet of Things (IOT) controller, and the IOT controller is configured to acquire and monitor data from vehicle IOT devices to generate the vehicle feature state indications. The user interface controller comprises a processor and non-transitory computer readable storage having instructions that, when executed by the processor, cause the user interface controller to cooperate with the IOT controller and the user interface to: determine a vehicle location of the smart vehicle, receive a vehicle feature state indication from the IOT controller of a state of a vehicle feature to service of the smart vehicle, and determine whether the vehicle feature state indication meets at least one servicing threshold. The instructions further cause the user interface controller to identify one or more servicing providers suitable to service the vehicle feature based on the state of the vehicle feature to service and the vehicle location when the vehicle feature state indication meets the at least one servicing threshold associated with an activity context. The one or more servicing providers are located within a predetermined proximity of the vehicle location. The instructions further cause the user interface controller to display the one or more servicing providers and the activity context on the display.

These and additional features provided by the embodiments described herein will be more fully understood in view of the following detailed description, in conjunction with the drawings.

BRIEF DESCRIPTION OF THE SEVERAL VIEWS OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
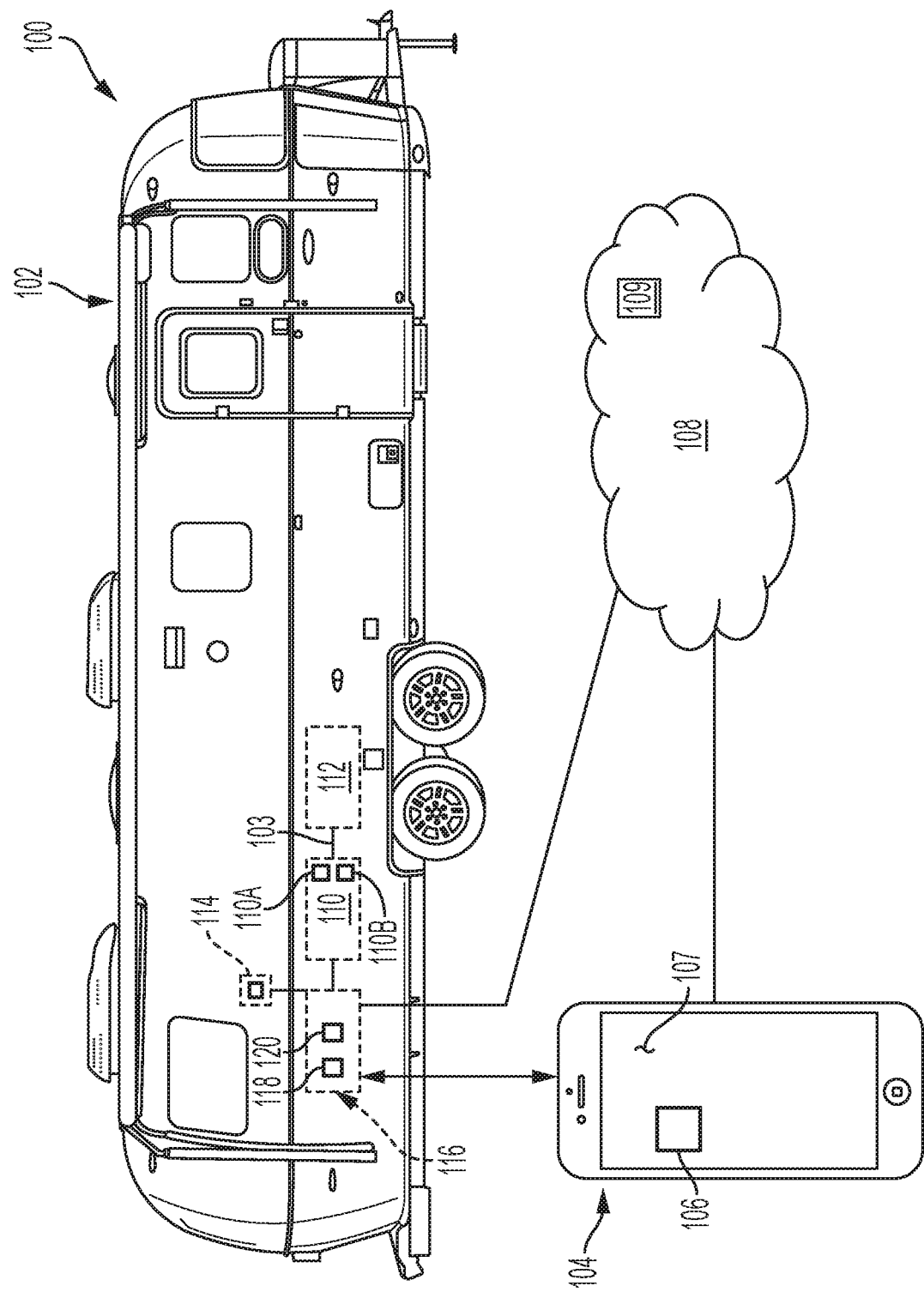
FIG. 1 schematically illustrates a system for implementing computer and software based methods to utilize a control system for smart vehicle travel preparation and location-based servicing with a smart mobile device paired with the smart vehicle, according to one or more embodiments shown and described herein.

Referring generally to the figures, embodiments of the present disclosure are directed to systems and methods for smart vehicle travel preparation through one or more modifiable, dynamic checklists and location-based servicing with a smart mobile device paired with the smart vehicle. As described herein, use of "smart" with respect to a device or item, such as a mobile device or vehicle or vehicle feature, is in reference to electronic devices or items that are configured to be in electronic communication with one or more other technologies through a wired or wireless communication link. By way of example, and not as a limitation, such a wired or wireless communication link may include a communication network as described herein, a communication path as described herein, conductors electronically connecting a pair of devices, and/or other conventional or yet-to-be developed technologies, or combinations thereof, as understood to those skilled in the art, to provide the communication link.

The control systems described herein streamline a process to prepare and service a smart vehicle during travel with a smart mobile device paired with the smart vehicle. Additionally, the systems described herein incorporate control to reduce an amount of processing time along with reducing a potential of human error of checklist preparation and/or servicing need monitoring and implementation, thereby increasing and improving processing speed and accuracy of the systems described herein.

Reference will now be made in detail to embodiments of the configuration systems, and examples of such systems are illustrated in the accompanying drawings. Wherever possible, the same reference numerals will be used throughout the drawings to refer to the same or like parts. Various embodiments of the configuration systems will be described in further detail herein with specific reference to the appended drawings.

Referring to FIG. 1, a control system 100 includes a smart vehicle 102. The smart vehicle 102 may be a recreational vehicle (RV), such as ones commercially available through AIRSTREAM, Inc. of Jackson Center, Ohio. Further, the control system 100 includes a router 116, one or more processors 110 communicatively coupled to the router 116, and a memory 112 communicatively coupled to the one or more processors 110. The router 116 may be configured for the smart vehicle 102 such that the router 116 is installed within and associated with the smart vehicle 102. The router 116 includes a first identification card 118 and a second identification card 120, as described in greater detail further below. Information from the router 116 is transmitted through the first identification card 118 and the second identification card 120 and uploaded to a router file in the network 108 (e.g., the cloud). Such information may include router information and information regarding the first identification card 118 and the second identification card 120, such as serial numbers and other identifying information. Such information stored in the cloud may be accessible by an application programming interface (API), as may be provided by the card services provider.

The control system 100 includes machine readable instructions stored in the memory 112 that cause the control system 100 to perform one or more of instructions when executed by the one or more processors 110. In at least one embodiment, and as described in greater detail below with respect to a process 200 of FIG. 2, which may be implemented by a processor 110 of FIG. 1, a method of operating or utilizing a control system 100 may include programming logic such as set forth in at least the process 200.

The control system 100 of FIG. 1 includes a smart mobile device 104 paired with the smart vehicle 102. A graphical user interface (GUI) is disposed on and as part of the display screen 107 of the smart mobile device 104 and is communicatively coupled to and controlled by a software application tool 106 configured to monitor and control one or more functionalities of the smart vehicle 102. The smart mobile device 104 may be a smartphone, a tablet, or a like portable handheld smart device. As a non-limiting example, the smart mobile device 104 may be a smartphone such as the iPHONE or a tablet such as the iPAD, both of which are commercially available from Apple, Inc. of Cupertino, Calif. The smart mobile device 104 includes a camera, a processor, a memory communicatively coupled to the processor, and machine readable instructions stored in the memory. The machine readable instructions may cause the configuration system to, when executed by the processor, launch and operate the software application tool 106 on the smart mobile device 104. The machine readable instructions may cause the configuration system to, when executed by the processor, use the functionality provided by the software application tool 106 to follow one or more control schemes as set forth in the one or more processes described herein.

Thus, smart mobile device 104 may be configured to be communicatively coupled to the smart vehicle 102. As an example and not a limitation, the machine readable instructions may include instructions to monitor internet of thing (IOT) vehicle control features of the smart vehicle 102 with the smart mobile device 104 paired with the smart vehicle 102. The machine readable instructions may further include instructions to automatically populate one or more dynamic checklists based on smart vehicle features and details and to utilize and/or modify the dynamic checklists during vehicle preparation, travel, and/or servicing based on the dynamic IOT vehicle control features with the smart mobile device 104 paired with the smart vehicle 102, as described in greater detail below.

In some embodiments, the smart mobile device 104 comprises a user interface and a user interface controller. The user interface may comprise a display, which could take the form of (or include) display screen 107 and/or the above-mentioned GUI disposed on the display screen, as examples. The user interface controller may comprise a processor and non-transitory computer readable storage, such as the processor and memory of the smart mobile device 104 described above. The non-transitory computer readable storage may have instructions that, when executed by the processor, cause the user interface controller to cooperate with the user interface (and/or an IOT controller, as will be described below) to carry out one or more functions described herein. For instance, the instructions may cause the user interface controller to launch and operate the software application tool 106, and to carry out the functions of the software application tool described herein.

Figure 2:
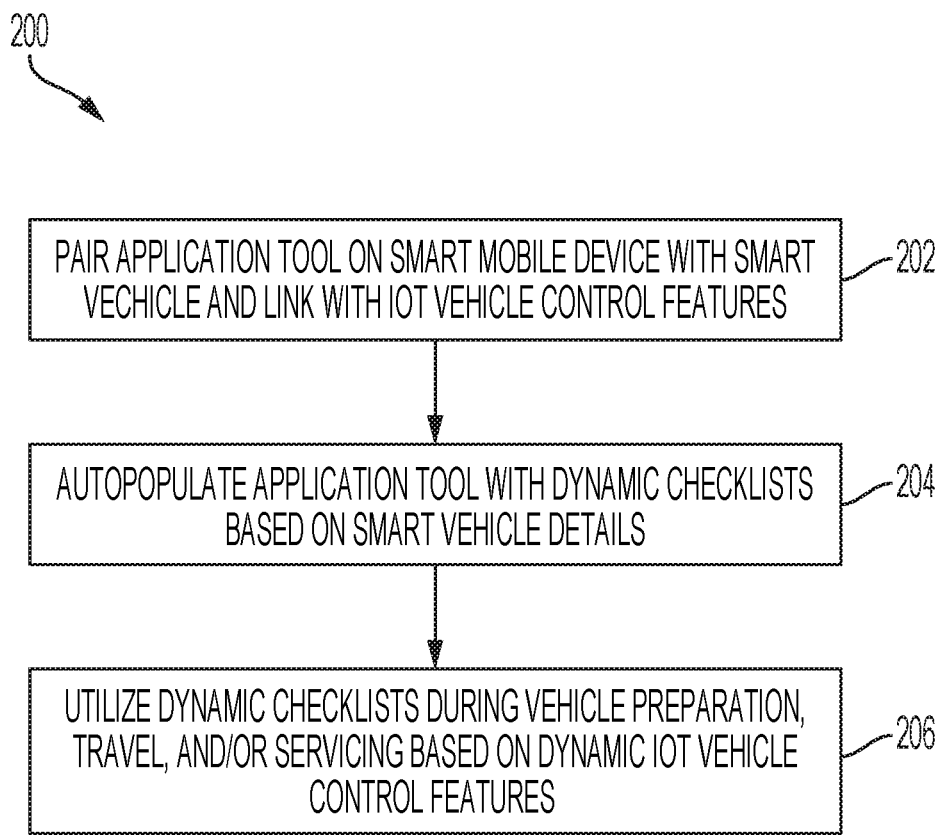
FIG. 2 is a flow chart of a process for using the control system of FIG. 1 for smart vehicle travel preparation and location-based servicing with a smart mobile device paired with the smart vehicle through one or more dynamic checklists, according to one or more embodiments shown and described herein.

Referring to FIGS. 1-2, a control system 100 for implementing a computer and software-based method for smart vehicle travel preparation through one or more modifiable, dynamic checklists and location-based servicing with the smart mobile device 104 paired with the smart vehicle 102 (FIG. 1) is illustrated and may be implemented through use of the GUI of the smart mobile device 104, for example. The system 100 further includes a communication path 103 communicatively coupled to the one or more processors 110, the memory 112, network interface hardware such as the router 116, and an identification component 114. The identification component 114 may be, for example, a unique quick response ("QR") code associated with the smart vehicle 102. For example, the QR code as the identification component 114 is a unique matrix barcode that includes a machine readable optical label containing information about the smart vehicle 102. The system may further include a storage or database, a network 108, and one or more servers 109.

By way of example, and not as a limitation, in a pairing mode, the smart mobile device 104 acts as a central device that may scan for data packets advertised by the smart vehicle 102 as a peripheral device, and an authentication code for pairing may be used to reject and filter out data packets from devices with which the central device is not interested in communicating. For example, a list of peripheral devices within a signal strength range of the central device may be displayed on a discovered devices list. The peripheral device may be selected from the discovered devices list of the central device, and an encrypted, paired connection may be established between the central device and the peripheral device. With use of scanning of the identification component 114 as described herein by the smart mobile device, a peripheral device need not be manually selected from a listing of peripheral devices within a signal strength range but rather may automatically be selected as the smart vehicle 102 associated with the scanned identification component 114 (e.g., the QR code pre-associated with the smart vehicle 102). Detection of no other user accounts being linked to a unique authentication certificate acts as an authenticator to determine whether the smart device 104 requesting pairing with the smart vehicle 102 is permitted to be provided with the unique authentication certificate. Provision of the unique authentication certification to one user account allows for only one user account to be able to be paired with the smart vehicle 102 at a time.

In some embodiments, the system 100 is implemented using a local area network (LAN) or wide area network (WAN) as the network 108, such as an intranet or the Internet, or other wired or wireless communication network that may include a cloud computing-based network configuration. The LAN may as a local network associated with the smart vehicle 102 provide local wireless access through the router 116 as an access point through a provisioned second identification card 120, as described in greater detail below. The WAN may provide remote wireless access through a card services provider, such as a cellular services provider configured to provide wireless access data usage through a remote cellular network.

As noted above, the system 100 includes the communication path 103 to communicatively couple the system components. The communication path 103 may be formed from any medium that is capable of transmitting a signal such as, for example, conductive wires, conductive traces, optical waveguides, or the like, or from a combination of mediums capable of transmitting signals. The communication path 103 communicatively couples the various components of the system 100. For instance, the smart mobile device 104 may be communicatively coupled to a cloud network via communication path 103 that couples the smart device with the cloud network As used herein, the term "communicatively coupled" means that coupled components are capable of exchanging data signals with one another such as, for example, electrical signals via conductive medium, electromagnetic signals via air, optical signals via optical waveguides, and the like.

As noted above, the system 100 includes the one or more processors 110. The one or more processors 110 can be any device capable of executing machine readable instructions. Accordingly, the processor 110 may be a controller, an integrated circuit, a microchip, a computer, or any other computing device. The one or more processors 110 may include an internet of things ("IOT") controller 110A and/or a vehicle controller 110B to control and exchange information regarding one or more vehicle functionalities. In some embodiments, IOT controller 110A is configured to acquire and monitor data from vehicle IOT devices to generate vehicle feature state indications. By way of example, and not as a limitation, sensors configured to detect water levels within the smart vehicle 102 may communicate such information to IOT controller 110A and/or a vehicle controller 110B. The identification component 114 may be associated with the smart vehicle 102 such that information regarding the association is sent to the network 108 (e.g., the cloud) through the controller interface and stored in the cloud, including, for example, the vehicle identification number (VIN) of the smart vehicle 102 and information regarding the IOT controller 110A. The software application tool may use the identification component 114 to pair with the smart vehicle 102 and be provided with access to the associated smart vehicle 102 information stored in the cloud.

The IOT controller 110A, vehicle controller 110B, and identification component 114 are linked and communicatively coupled to connect, interact with, and exchange data between each other. The identification component 114 is thus associated with the router 116 and the router file in the cloud to further provide vehicle specific information about the associated smart vehicle 102 within which the router 116 is installed to the cloud. The identification component 114 may be a unique QR code configured to act as a digital key to identify the associated smart vehicle 102. Thus, associating the identification component 114 with the router 116 sends information such as the unique QR code to the router file in the cloud. Additionally sent information may include the vehicle identification number (VIN) of the smart vehicle 102 and information regarding the IOT controller 110A.

The IOT controller 110A is configured to connect, interact with, and exchange data between the vehicle subsystems through an interface control. By way of example, and not as a limitation, the IOT controller 110A may be a CZone controller as commercially available by Power Products, LLC of Menomonee Falls, Wis. The CZone controller is configured to replace one or more hard wired switch and fuse panels with networked digital switch interfaces to provide control of onboard electrical systems through an intelligent management system. The CZone controller may combine multiple circuits through a mode selection functionality and monitor vehicle systems and components while retaining control over specific circuits and functionality. The CZone controller is configured to provide the user with an interface able to providing provide such monitoring and control functionality, such as for power management automation.

Further, the vehicle controller 110B is configured to connect, interact with, and exchange data between various vehicle subsystems. The vehicle controller 110B may be a vehicle control area network bus ("CAN bus") controller. The CAN bus controller incorporates a robust vehicle bus standard to allow microcontrollers and vehicle devices to communicate within the vehicle systems without a host computer. The CAN bus controller incorporates a message-based protocol that cooperates with multiplex electrical wiring within the smart vehicle 102. Further, the CAN bus controller is configured to permit interaction between various vehicle systems to allow for a wide range of functionality and control through use of software rather than hard wiring between such systems. By way of example, and not as a limitation, a vehicle subsystem may control actuators or receive feedback from sensors through the CAN bus controller to control a vehicle functionality. The CAN bus is configure to collate various sensor inputs from one or more different vehicle subsystems as needed to determine whether to enact a vehicle functionality of the vehicle subsystem based on those sensor inputs.

The one or more processors 110 are communicatively coupled to the other components of the system 100 by the communication path 103. Accordingly, the communication path 103 may communicatively couple any number of processors with one another, and allow the modules coupled to the communication path 103 to operate in a distributed computing environment. Specifically, each of the modules can operate as a node that may send and/or receive data. The one or more processors 110 may process the input signals received from the system modules and/or extract information from such signals.

As noted above, the system 100 includes the memory 112 which is coupled to the communication path 103 and communicatively coupled to the one or more processors 110. The memory 112 may be a non-transitory computer readable medium or non-transitory computer readable memory and may be configured as a nonvolatile computer readable medium. The memory 112 may comprise RAM, ROM, flash memories, hard drives, or any device capable of storing machine readable instructions such that the machine readable instructions can be accessed and executed by the one or more processors 110. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory 112. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In embodiments, the system 100 may include the one or more processors 110 communicatively coupled to the memory 112 that stores instructions that, when executed by the one or more processors 110, cause the processor to perform one or more functions as described herein.

Still referring to FIG. 1, as noted above, the system 100 comprises a smart mobile device 104 that includes a screen 107 configured to display a GUI of a smart vehicle software application tool 106 accessible by the smart mobile device 104 for providing visual output such as, for example, information, graphical reports, messages, or a combination thereof. The smart mobile devices may include smartphones, tablets, laptops, and/or the like. After pairing, the communication path 103 communicatively couples the smart vehicle software application tool 106 to other modules of the system 100. The screen 107 can include any medium capable of transmitting an optical output such as, for example, a cathode ray tube, light emitting diodes, a liquid crystal display, a plasma display, or the like.

The system 100 includes the network interface hardware for communicatively coupling the system 100 with a computer, cloud, and/or cellular network such as network 108. The network interface hardware may include, for example, the router 116 coupled to the communication path 103 and other modules of the system 100. The network interface hardware can be any device capable of transmitting and/or receiving data via a wireless network. Accordingly, the network interface hardware can include a communication transceiver for sending and/or receiving data according to any wireless communication standard. For example, the network interface hardware can include a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

The network 108 can include any wired and/or wireless network such as, for example, local area networks, wide area networks, metropolitan area networks, the Internet, an Intranet, the cloud, satellite networks, or the like. Accordingly, the network 108 can be utilized as a wireless access point by the smart vehicle 102 and/or smart mobile device 104 to access one or more servers 109. The one or more servers 109 may include a cloud server and generally include processors, memory, and chipset for delivering resources via the network 108. Resources can include providing, for example, processing, storage, software, and information from the one or more server 109 to the system 100 via the network 108. Additionally, it is noted that the one or more servers 109 can share resources with one another over the network 108 such as, for example, via the wired portion of the network, the wireless portion of the network, or combinations thereof.

Still referring to FIG. 1, data from various applications running on the one or more processors 110 can be provided from the smart vehicle 102 to the system 100 via the router 116. The smart vehicle 102 may include or be coupled to one or more computers communicatively coupled with the one or more processors 110, which computers can be any device having hardware (e.g., chipsets, processors, memory, etc.) for communicatively coupling with the router 116 and the network 108. Specifically, the computers can include an input device having an antenna for communicating over one or more of the wireless computer networks described above. Such a computer may include the smart mobile device 104 after pairing with the router 116 as described herein.

The router 116 includes a first identification card 118 and a second identification card 120. The first and second identification cards 118, 120 may be a pair of subscriber identity module (SIM) cards, or SIMS, each of which is an integrated circuit that securely stores an international mobile subscriber identity (IMSI) number and related key information used to identify and authenticate subscribers of smart mobile telephone devices. Each SIM card may also store contact information. Each SIM card may also store its own unique serial number as an integrated circuit card identifier (ICCID), the IMSI number, security authentication and ciphering information, local network related temporary information, a list of accessible user services, a user password as a personal identification number (PIN), and a personal unblocking code to unlock the PIN. A card services provider may be able to identify and authenticate a SIM card to provide services, such as cellular and/or wireless data services to a device within which the SIM card is installed.

The first identification card 118 is configured for operation with IOT control of the vehicle, such as for association with the IOT controller 110A to provide technology information and/or telemetry information to, for example, the cloud for a card services provider and/or permitted users of the first identification card 118. By way of example, and not as a limitation, such telemetry information includes vehicle data of the smart vehicle 102 that is sent to the cloud for monitoring and/or tracking purposes with respect to the smart vehicle 102. For example, submission of such data from a variety of smart vehicles 102 may permit monitoring and/or tracking of vehicle information across a fleet of vehicles and an associated ease and efficiency of fleet management. The second identification card 120 is configured to operate as an authenticated access point to provide wireless data services from the card services provider.

Dynamic Checklists

Referring to FIG. 2, a process 200 is depicted for smart vehicle travel preparation through one or more modifiable, dynamic checklists and location-based servicing with a smart mobile device 104 paired with the smart vehicle 102. In block 202, the smart mobile device 104 is paired with the smart vehicle 102 through a software application tool 106 on the smart mobile device 104. Further, the software application tool 106 is linked with the IOT controller 110A of the smart vehicle 102 to access and/or monitor one or more IOT vehicle control features from the smart vehicle 102. By way of example, and not as a limitation, FIGS. 3-4 described in greater detail below depict screens of the software application tool 106 for such vehicle control and/or monitoring. Such IOT vehicle control features may include smart vehicle information regarding the HVAC system, the vents system, the toilets, water levels (for potable water, reusable water, and/or waste water), solar panels, battery levels, the lighting systems, the security system, and/or the camera systems.

In block 204, the software application tool 106 is automatically populated with one or more dynamic checklists based on the smart vehicle details. In embodiments, the smart vehicle details may include a type of the smart vehicle 102 and/or the linked one or more IOT vehicle control features. For example, the details may include usage data associated with the smart vehicle 102 (such as battery and/or water levels) and/or a location of the smart vehicle 102. The one or more dynamic checklists may query and access a static database as stored in the cloud (e.g., the network 108) and download the information to the software application tool 106 as modifiable information based on the smart vehicle details, as described in greater detail below.

In block 206, the one or more dynamic checklists are utilizing during vehicle preparation, travel, and/or servicing based on the dynamic IOT vehicle control features. For instance, a checklist may be generated based on a vehicle state indication generated by IOT controller 110A. In a non-limiting example, a vehicle property includes a vehicle configuration, a vehicle feature state indication, or both. The vehicle property is received, and a checklist is generated based on the vehicle property. The vehicle configuration may comprise a type of the smart vehicle, an indication of one or more vehicle features installed at the smart vehicle, or combinations thereof, among other possibilities. In some embodiments, receiving the vehicle property comprises downloading the vehicle configuration from a static database stored in a cloud network.

Figure 4:
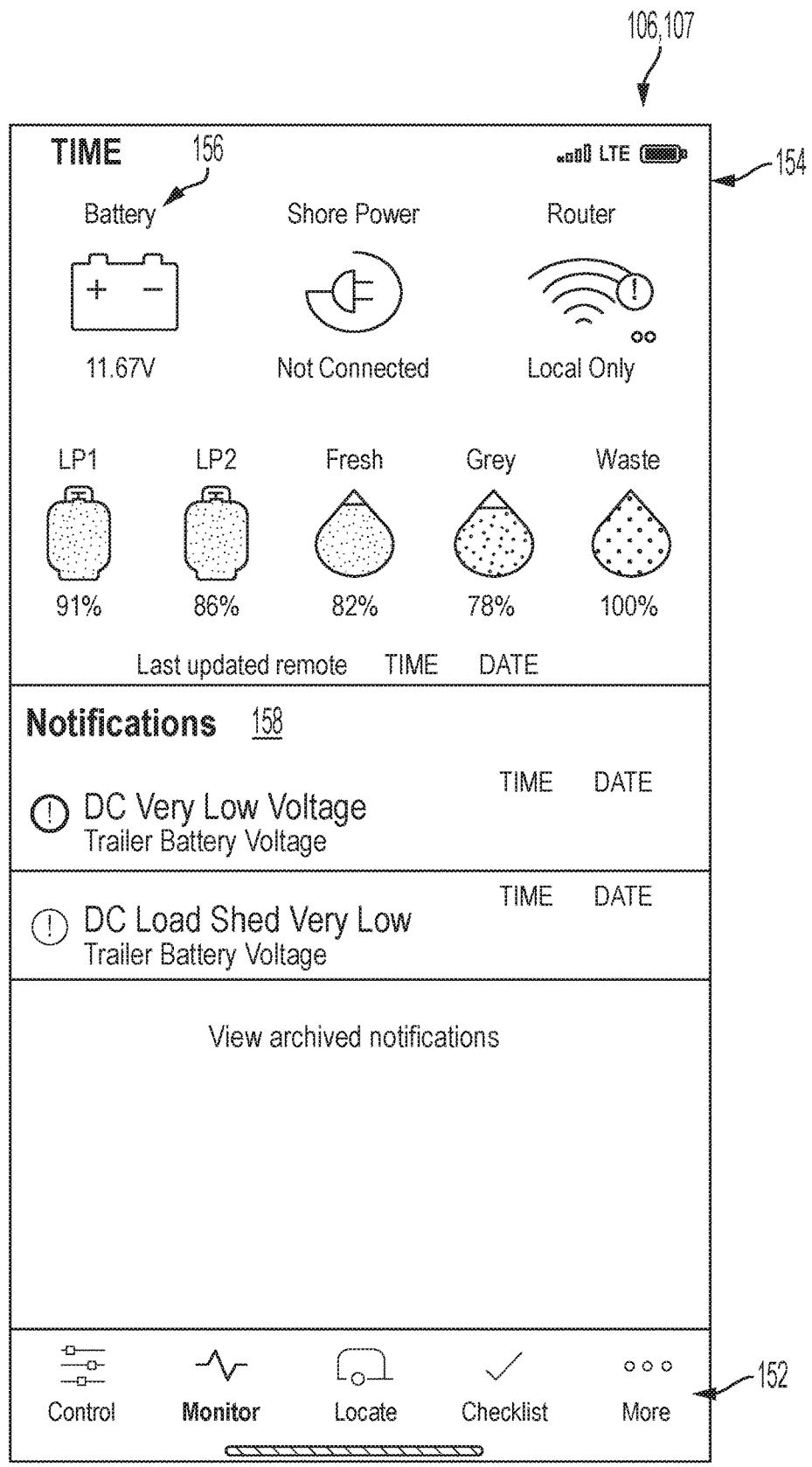
FIG. 4 is a screenshot view on the GUI of the smart vehicle software application tool showing a monitor screen on the smart mobile device configured to display usage and/or status levels associated with smart vehicle functionalities, according to one or more embodiments shown and described herein.

By way of another example, and not as a limitation, the software application tool 106 is configured to monitor the dynamic IOT vehicle control features, such as levels as shown in FIG. 4 and described in greater detail below, to determine whether and when identified features require servicing. Based on a determination of a servicing requirement, the software application tool 106 is configured to use a locate feature to determination the location of the smart vehicle 102 and one or more servicing facilities to service the identified features within a predetermined proximity of the location of the smart vehicle 102. In an embodiment, a high waste water level may indicate a need to identify a nearby waste water dump site. The control system 100 may be configured to locate all accessible waste water dump sites within a 10 mile radius, for example, and provide an alert through the software application tool of the high waste water level along with an indicator of the locations and/or directions to the nearest available waste water dump sites in real-time.

One or more servicing providers, suitable to service a vehicle feature of the smart vehicle 102, may be identified and displayed on a display of a user interface of the smart mobile device 104. In an embodiment, a vehicle location of the smart vehicle 102 is determined, and a vehicle feature state indication, of a state of a vehicle feature to service of the smart vehicle 102, is received from the smart vehicle 102 (e.g., from an IOT controller of the smart vehicle). Control system 100 (e.g., a user interface controller of the smart mobile device 104) determines whether the vehicle feature state indication meets at least one servicing threshold, and one or more servicing providers, suitable to service the vehicle feature, are identified based on the state of the vehicle feature to service and the vehicle location when the vehicle feature state indication meets the at least one servicing threshold. The one or more servicing providers are located within a predetermined proximity of the vehicle location, and the one or more servicing providers are displayed on the display of the user interface of the smart mobile device 104.

The at least one servicing threshold may be associated with an activity context, which could comprise a trip departure, a campsite arrival, or a campsite departure, as examples. In some embodiments, the at least one servicing threshold comprises a servicing threshold associated with an activity context, and determining whether the vehicle feature state indication meets the at least one servicing threshold comprises determining whether the vehicle feature state indication meets the servicing threshold associated with the activity context. The one or more servicing providers and the activity context may be displayed on the display.

Further, FIGS. 5-12 described in greater detail below depict screens of the software application tool 106 for access to and use of such dynamic checklists during vehicle preparation and/or travel. Such checklist items for taking care of identified features with currently identified levels (i.e., notification of waste water at a high level when preparing to enter or leave a campsite and recommended actions including locating nearby waste removal sites) may be added to and modified per the currently identified levels within the one or more dynamic checklists. The checklist may be generated based on a vehicle property, an activity context, or both, among other possibilities. For instance, in some embodiments, control system 100 (e.g., a user interface controller of the smart mobile device 104) generates a dynamic and modifiable checklist comprising one or more tasks based on an activity context, and the dynamic and modifiable checklist is displayed at a display of a user interface of the smart mobile device 104. The one or more tasks may include one or more first tasks based on a first vehicle property, one or more second tasks based on a second vehicle property, or combinations thereof. In some embodiments, a checklist comprising one or more tasks is generated based on an activity context, the one or more tasks comprising a task to service a vehicle feature when a vehicle feature state indication meets at least one servicing threshold.

Figure 3:
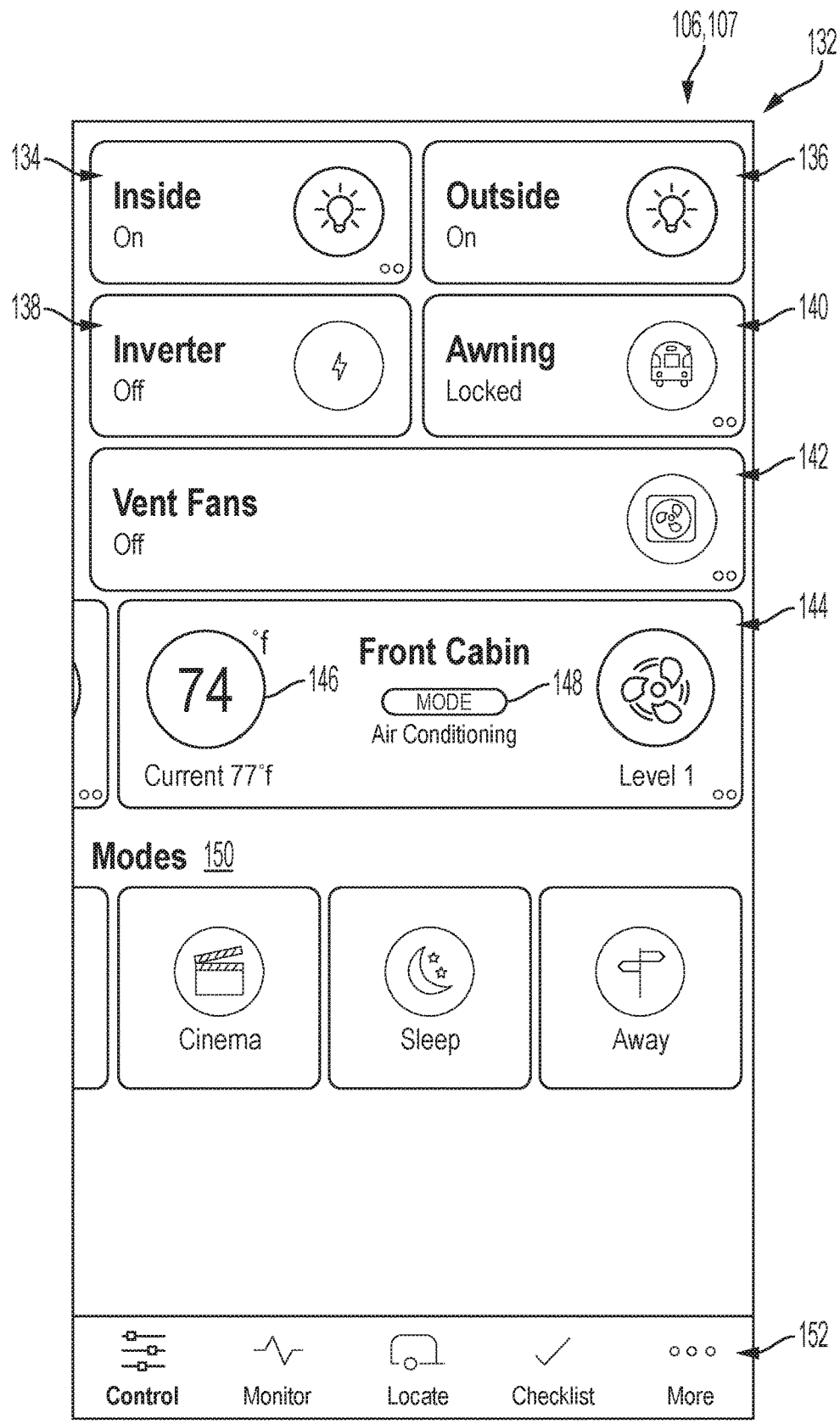
FIG. 3 is a screenshot view on a graphical user interface (GUI) of a smart vehicle software application tool of the smart mobile device paired with the smart vehicle and showing a control screen on the smart mobile device configured to control one or more smart vehicle functionalities, according to one or more embodiments shown and described herein.

FIG. 3 depicts a control screen 132 of the software application tool 106 on the display screen 107 of smart mobile device 104 after pairing with the smart vehicle 102.

The control screen 132 is configured to control one or more smart vehicle functionalities. The control screen 132 is accessed from the software application tool 106 through selection of a Control icon from an options banner 152 at the bottom of the GUI of the software application tool 106 displayed on the display screen 107 of the smart mobile device 104. Other icons in the options banner 152 include a Monitor icon to monitor the status of various vehicle subsystems, a Locate icon to connect the vehicle with external Global Positioning System (GPS) map data to locate the vehicle with respect to such map data, a Checklist icon to provide checklist information associated with the smart vehicle 102, and a More icon for additional icon selections. With respect to the control screen 132, the control screen 132 is configured to control various vehicle functionalities through the IOT controller 110A and/or vehicle controller 110B.

By way of example, and not as a limitation, an Inside button 134 is configured to control the lighting inside the smart vehicle 102, such as turning the lighting on or off or dimming the lighting in different portions of the smart vehicle 102. An Outside button 136 is configured to similarly control the lighting attached outside the smart vehicle 102. An Inverter button 138 is configured to control power associated with running the smart vehicle 102, such as controlling conversion between direct current (DC) and alternating current (AC) for various vehicle subsystems. An Awning button 140 is configured to control whether an awning of the smart vehicle 102 is opened, closed, and/or locked. A Vent Fans button 142 is configured to control whether one or more vent fans of the smart vehicle 102 are on or off (e.g., opened or closed). A Front Cabin button 144 includes additional sub-controls for the front cabin of the smart vehicle 102, such as temperature control through a temperature button 146, HVAC mode selection through a mode button 148 (e.g., showing an air condition (AC) mode selection in FIG. 9), and a level of one or more vent fans in the front cabin. Similar buttons may be scrolled to including similar options for other portions of the smart vehicle 102, such as a rear cabin. A Modes 150 section includes additional icons such as for a Cinema control mode to control audiovisual systems of the smart vehicle 102, Sleep control mode to control nighttime settings in the smart vehicle 102, for example, and an Away mode to control away settings for the smart vehicle 102 when the user may be away from the smart vehicle.

FIG. 4 depicts a monitor screen 154 of the software application tool 106 on the display screen 107 of smart mobile device 104 after pairing with the smart vehicle 102. The monitor screen 154 is accessible by the Monitor icon from the options banner 152. Further, monitor screen 154 is configured to monitor one or more smart vehicle features 156 such as battery levels, shore power connection status, router status, toilet tank levels, and water levels (of potable, reusable, and/or waste water). The monitor screen 154 is further configured to display notifications 158, which may be timestamped, such as notifications of low voltage or load shed levels of the smart vehicle 102. The monitor screen 154 is further configured to access archived notifications.

Figure 5:
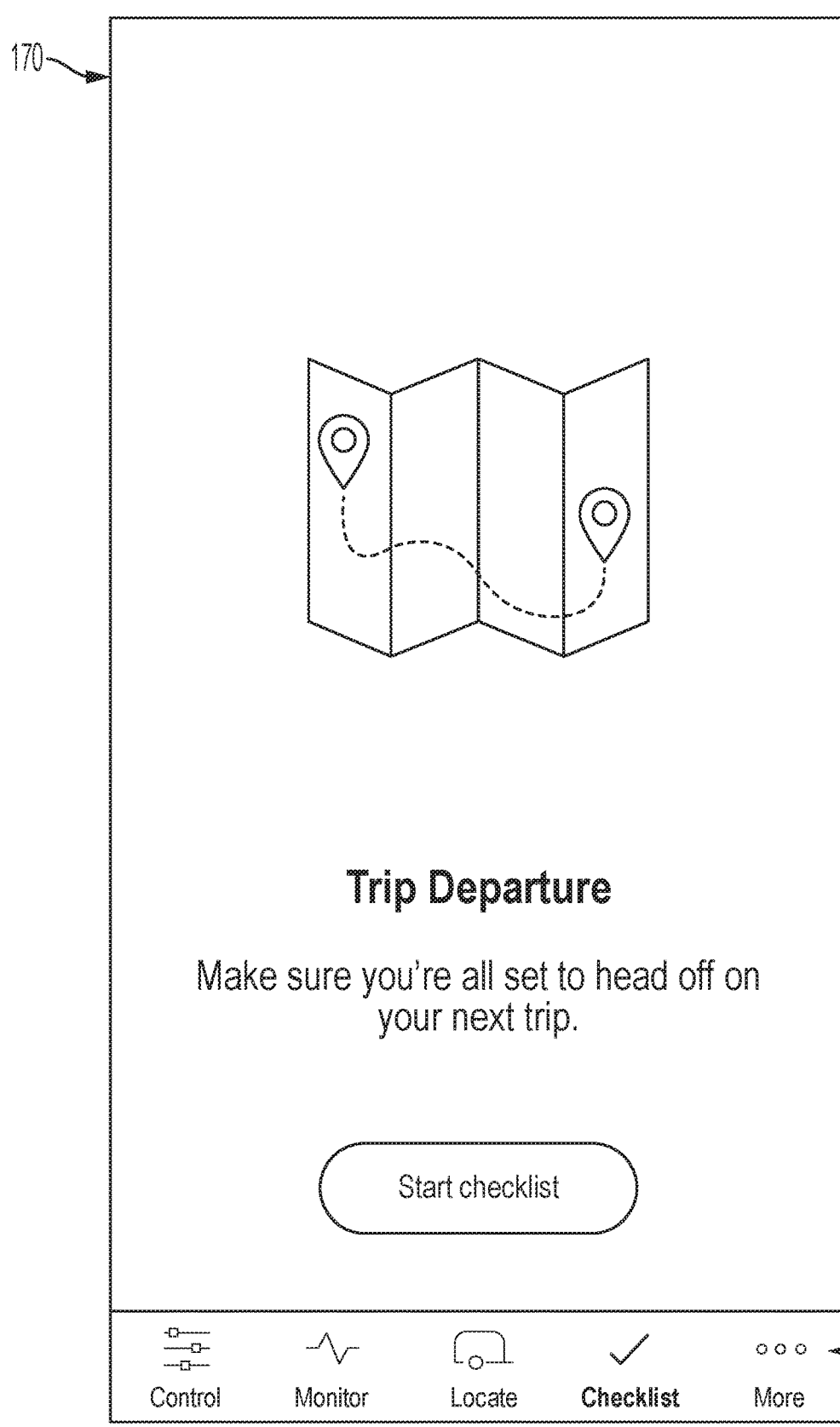
FIG. 5 is a screenshot view on the GUI of the smart vehicle software application tool showing a trip departure preparation screen on the smart mobile device, according to one or more embodiments shown and described herein.

FIG. 5 depicts a screenshot view on the GUI of the software application tool 106 showing a trip departure preparation screen 170 on the smart mobile device 104. The trip departure preparation screen 170 is accessible by selection of the Checklist icon from the options banner 152 at the bottom of the GUI of the software application tool 106. The trip departure preparation screen 170 provides a button option to select to prepare a dynamic checklist for trip departure, and the checklist may be generated in response to selection of the button option. As noted above, the checklist may be generated based on a vehicle property and an activity context, and in the example of FIG. 5, the activity context takes the form of a trip departure.

In some embodiments, a context indication is received via a user interface of the smart mobile device 104, and the context indication is representative of an activity context for a vehicle property. For instance, a checklist preparation screen may be associated with a given activity context and may provide a button option to select to prepare a dynamic checklist for the associated activity context. The checklist preparation screen may be displayed at a display of the user interface, and the context indication could take the form of a selection of the button option provided on the checklist preparation screen associated with the given activity context. In FIG. 5, for example, the trip departure preparation screen 170 is associated with a trip departure, and the context indication may take the form of a selection of the button option to prepare a dynamic checklist for the trip departure. In an embodiment, a checklist comprises one or more tasks is generated based on an activity context, and the one or more tasks comprise a task to service a vehicle feature when a vehicle feature state indication meets at least one servicing threshold.

Figure 6:
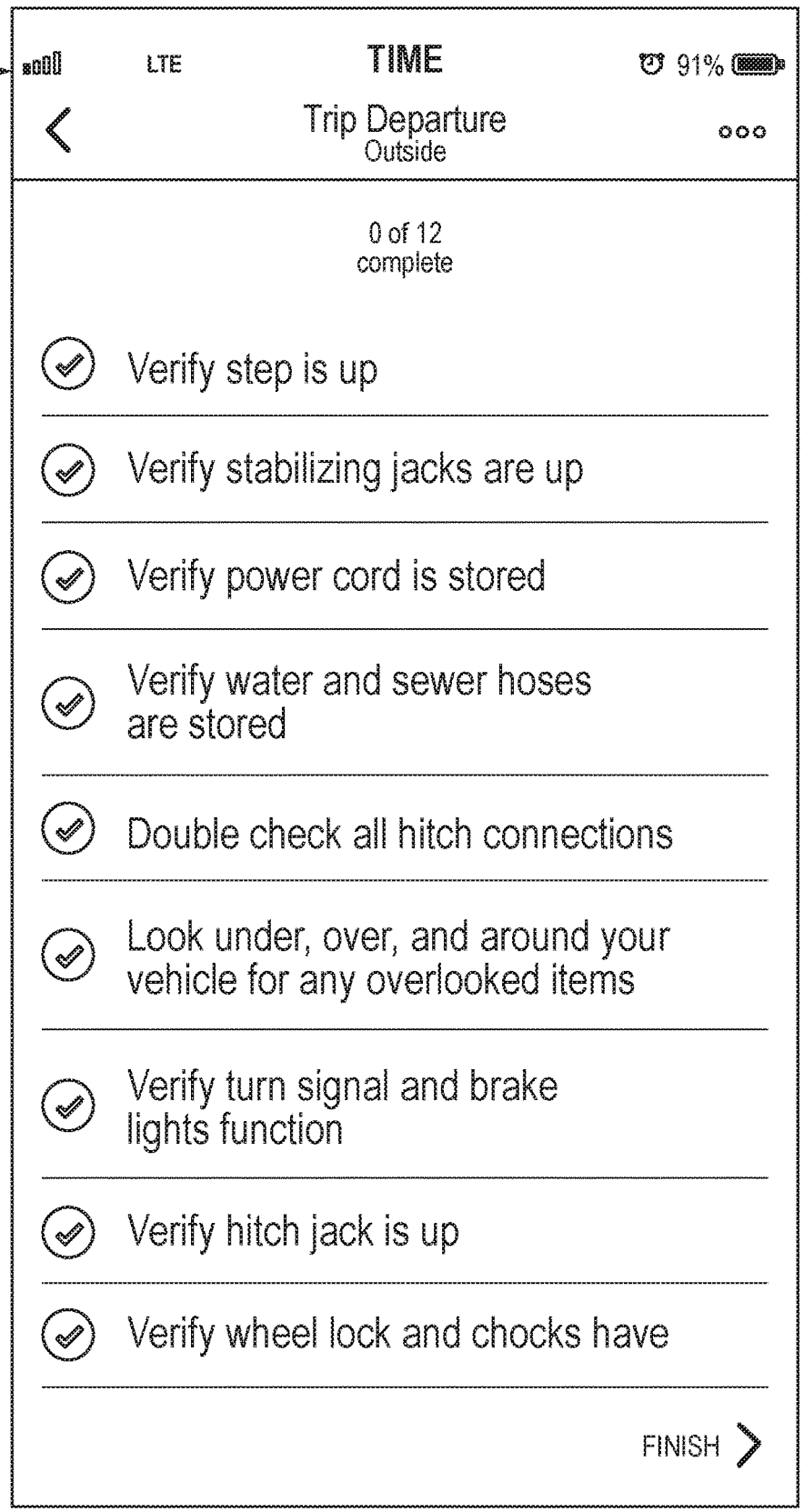
FIG. 6 is a screenshot view on the GUI of the smart vehicle software application tool showing an outside departure checklist accessible through the trip departure preparation screen of FIG. 5 on the smart mobile device, according to one or more embodiments shown and described herein.

FIG. 6 is a screenshot view on the GUI of the software application tool 106 showing an outside departure checklist screen 172 accessible from trip departure preparation screen 170 of FIG. 5 on the smart mobile device 104. In embodiments, dynamic checklist items may include one or more notes that once complete may be checked off by a checkmark button next to the respective note. In an embodiment, a checklist comprises one or more tasks, and each task could take the form of (or include) a respective note. A user may be enabled to manually modify the checklist via a display of a user interface of the smart mobile device 104. A listing on the top of the outside departure checklist screen 172 may show how many notes are complete and checked of a total amount of notes. The one or more notes may be to, for example, verify a step is up; verify stabilizing jacks are up; verify a power cord is stored; verify water and sewer hoses are stored; double check all hitched connections; look under, over, and around the vehicle for any overlooked items; verify turn signal and brake lights function; verify hitch jack is up; verify wheel lock and chocks have been removed; move a couple of feet to check all wheels are rolling; verify vehicle(s) brakes work correctly; and verify leveling blocks are stored.

Figure 7:
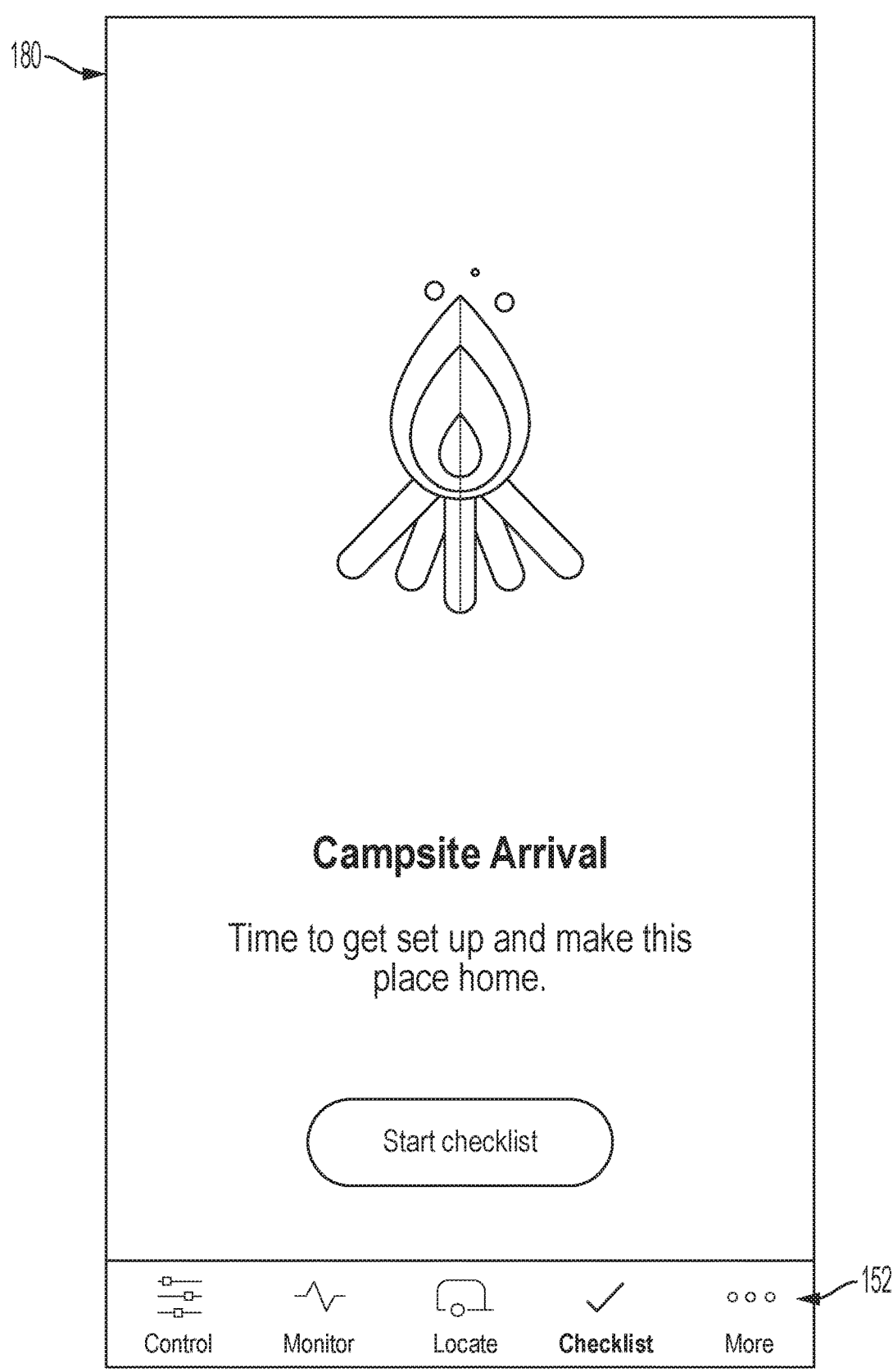
FIG. 7 is a screenshot view on the GUI of the smart vehicle software application tool showing a campsite arrival preparation screen on the smart mobile device, according to one or more embodiments shown and described herein.
Figure 8:
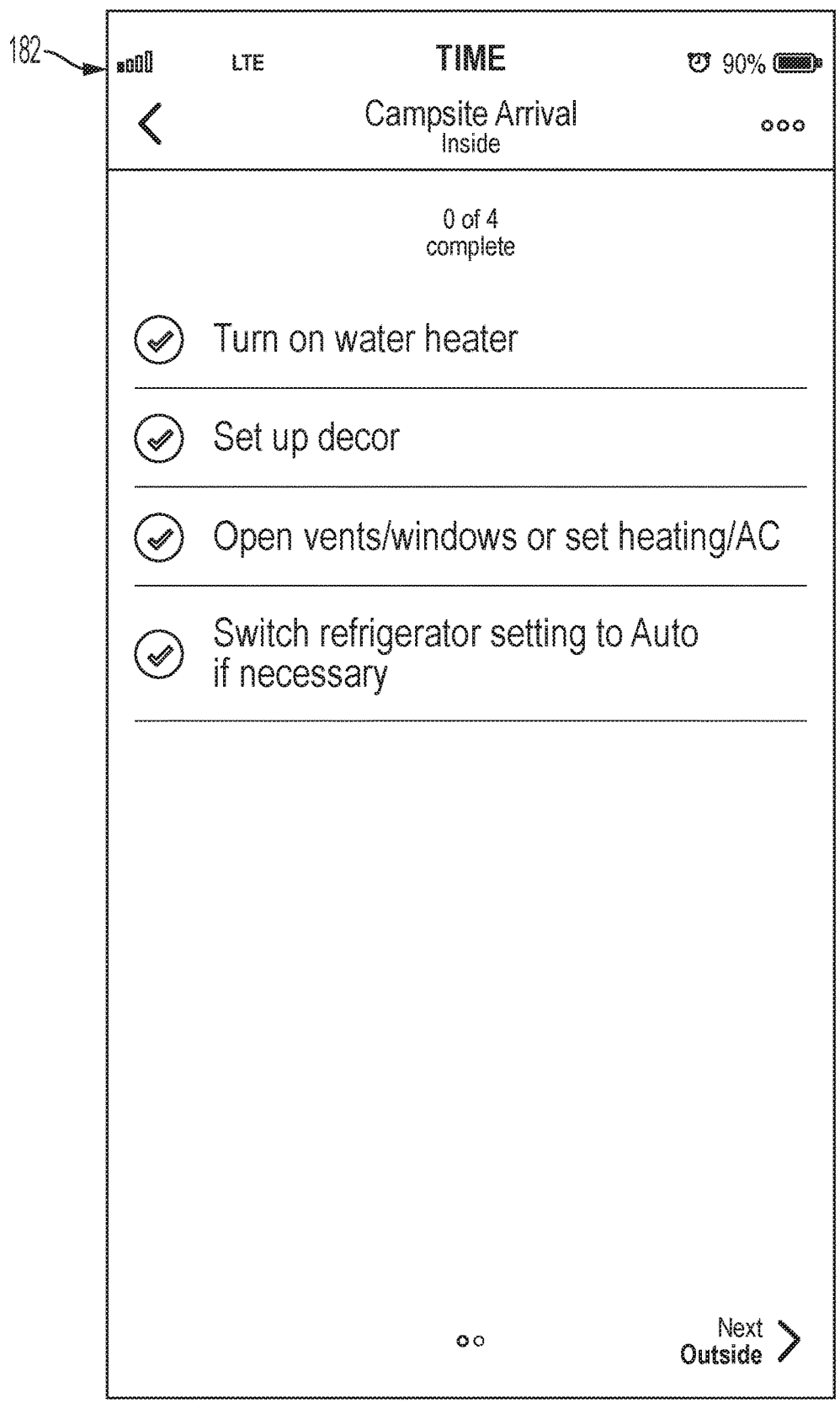
FIG. 8 is a screenshot view on the GUI of the smart vehicle software application tool showing an inside campsite arrival preparation checklist accessible through the campsite arrival preparation screen of FIG. 7 on the smart mobile device, according to one or more embodiments shown and described herein.

FIG. 7 depicts a screenshot view on the GUI of the software application tool 106 showing a campsite arrival preparation screen 180 on the smart mobile device 104. The campsite arrival preparation screen 180 is accessible by selection of the Checklist icon from the options banner 152 at the bottom of the GUI of the software application tool 106. The campsite arrival preparation screen 180 provides a button option to select to prepare a dynamic checklist for campsite arrival. In an example, the campsite arrival preparation screen 180 is associated with a campsite arrival, and a received context indication takes the form of a selection of the button option to prepare a dynamic checklist for the campsite arrival. FIG. 8 is a screenshot view on the GUI of the software application tool 106 showing an inside campsite arrival checklist screen 182 accessible from campsite arrival preparation screen 180 of FIG. 7 on the smart mobile device 104. The one or more notes of FIG. 8 may be to, for example, turn on the water heater; set up décor; open vents/window or set heating/AC; and switch refrigerator setting to Auto if necessary.

Figure 9:
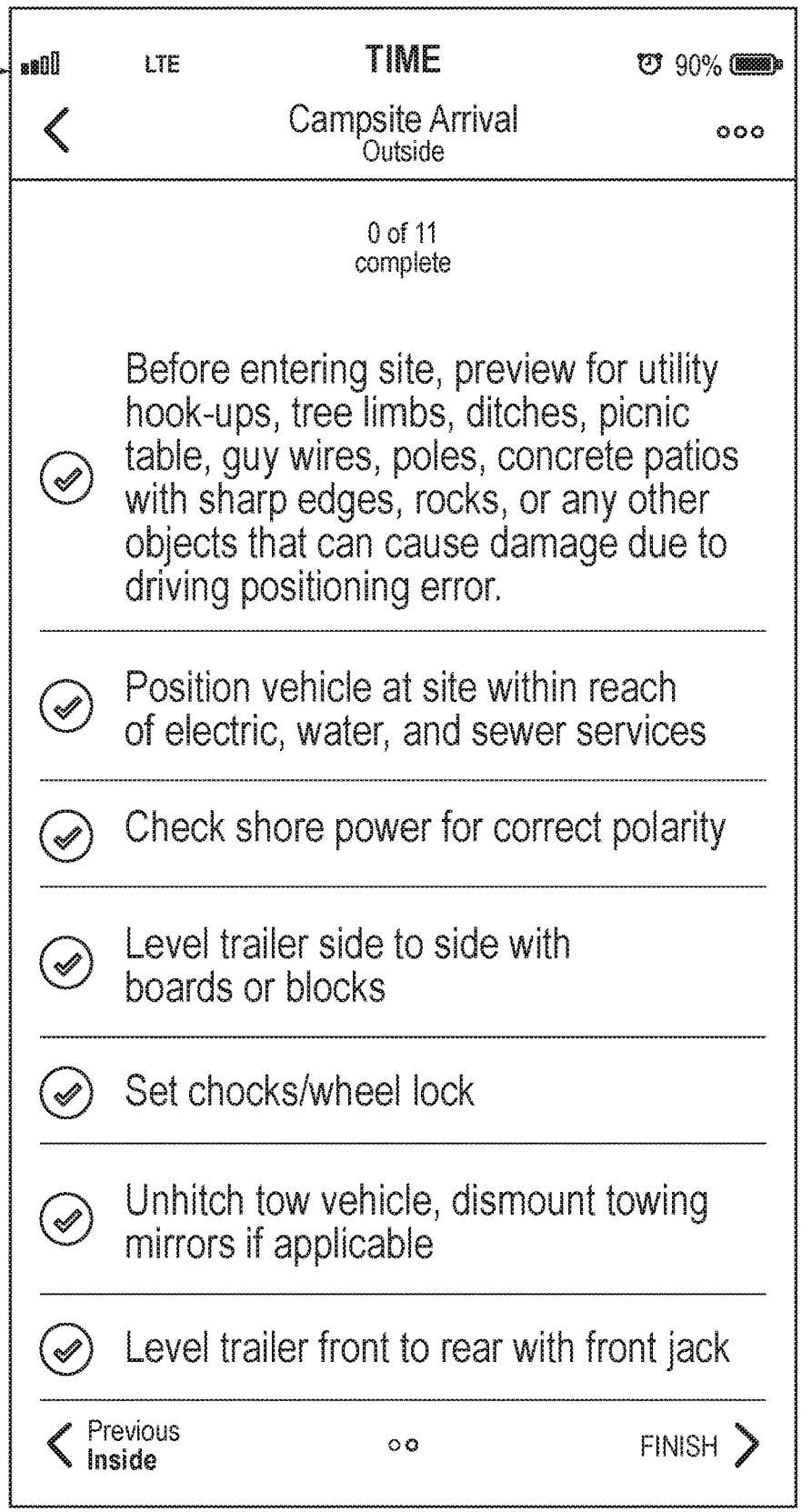
FIG. 9 is a screenshot view on the GUI of the smart vehicle software application tool showing an outside campsite arrival preparation checklist accessible through the campsite arrival preparation screen of FIG. 7 on the smart mobile device, according to one or more embodiments shown and described herein.

FIG. 9 is a screenshot view on the GUI of the software application tool 106 showing an outside campsite arrival checklist screen 184 accessible from an arrow button feature on the bottom of the inside campsite arrival checklist screen 182 of FIG. 8 on the smart mobile device 104. The one or more notes of FIG. 9 may be to, for example, previous for potentially damaging obstacles prior to entering a campsite; position the vehicle at the site within reach of electric, water, and sewer services; check shore power for correct polarity; level trailer side to side with boards or blocks; set chocks/wheel lock; unhitch tow vehicle, dismount towing mirrors if applicable; level trailer front to rear with front jack; set stabilizer jacks, awnings; turn on propane; stow/lock up trailer hitch parts; and connect utilities if available (such as water, sewer, electric, Wi-Fi). The inside campsite arrival checklist screen 182 of FIG. 8 may be returned to through an arrow button feature on the bottom of the outside campsite arrival checklist screen 184 of FIG. 9.

Figure 10:
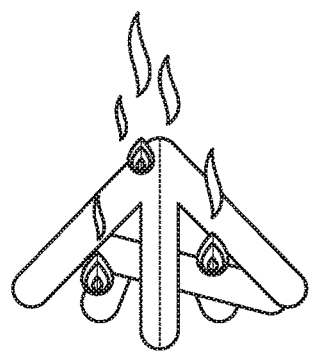
FIG. 10 is a screenshot view on the GUI of the smart vehicle software application tool showing a campsite departure preparation screen on the smart mobile device, according to one or more embodiments shown and described herein.
Figure 10:
Figure 10:
Figure 10:
Figure 10:
Figure 10:
Figure 11:
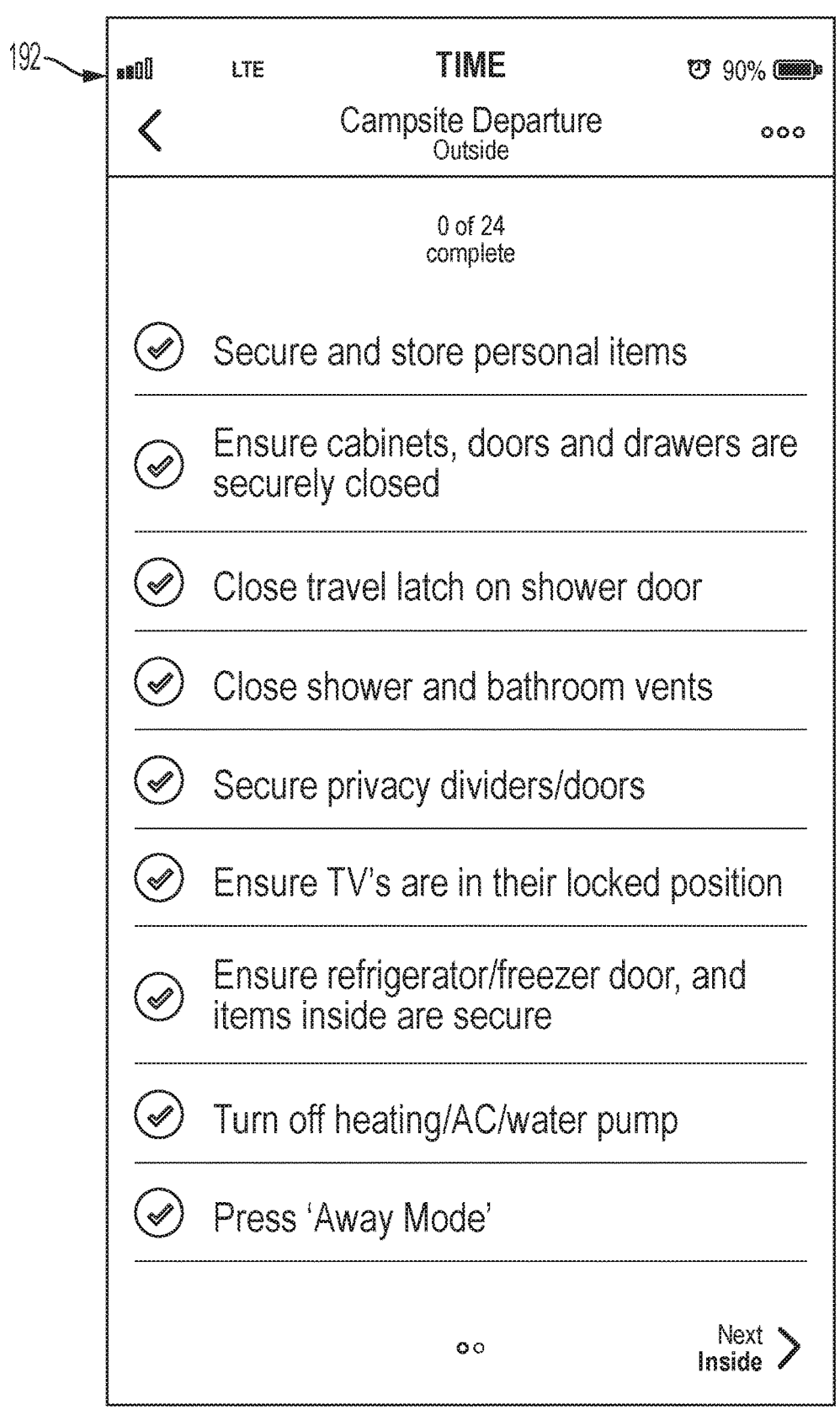
FIG. 11 is a screenshot view on the GUI of the smart vehicle software application tool showing an outside campsite departure preparation checklist accessible through the campsite departure preparation screen of FIG. 10 on the smart mobile device, according to one or more embodiments shown and described herein.

FIG. 10 depicts a screenshot view on the GUI of the software application tool 106 showing a campsite departure preparation screen 190 on the smart mobile device 104. The campsite departure preparation screen 190 is accessible by selection of the Checklist icon from the options banner 152 at the bottom of the GUI of the software application tool 106. The campsite departure preparation screen 190 provides a button option to select to prepare a dynamic checklist for campsite departure. In an example, the campsite departure preparation screen 190 is associated with a campsite departure, and a received context indication takes the form of a selection of the button option to prepare a dynamic checklist for the campsite departure. FIG. 11 is a screenshot view on the GUI of the software application tool 106 showing an outside campsite departure checklist screen 192 accessible from campsite departure preparation screen 190 of FIG. 10 on the smart mobile device 104. The one or more notes of FIG. 11 may be to, for example, secure and store personal items; ensure cabinets, door and drawers are securely closed; close a travel latch on a shower door; close shower and bathroom vents; secure privacy dividers/doors; ensure TVs are in a locked position; ensure refrigerator/freezer door and items inside are secure; turn off heating/AC/water pump; press 'Away Mode'; turn on tank heaters if outside temperatures require it; ensure awnings are retracted; secure outside storage compartments; latch outside kitchen vent; raise stabilizing jacks; clean out tanks; store water hose; store waste hose; store power cable; hitch the smart vehicle to a tow vehicle; check lights, brake lights, and turn signals; check tire pressure; remove any wheel chocks; stow the entry step; and ensure entry door is completely closed and locked.

Figure 12:
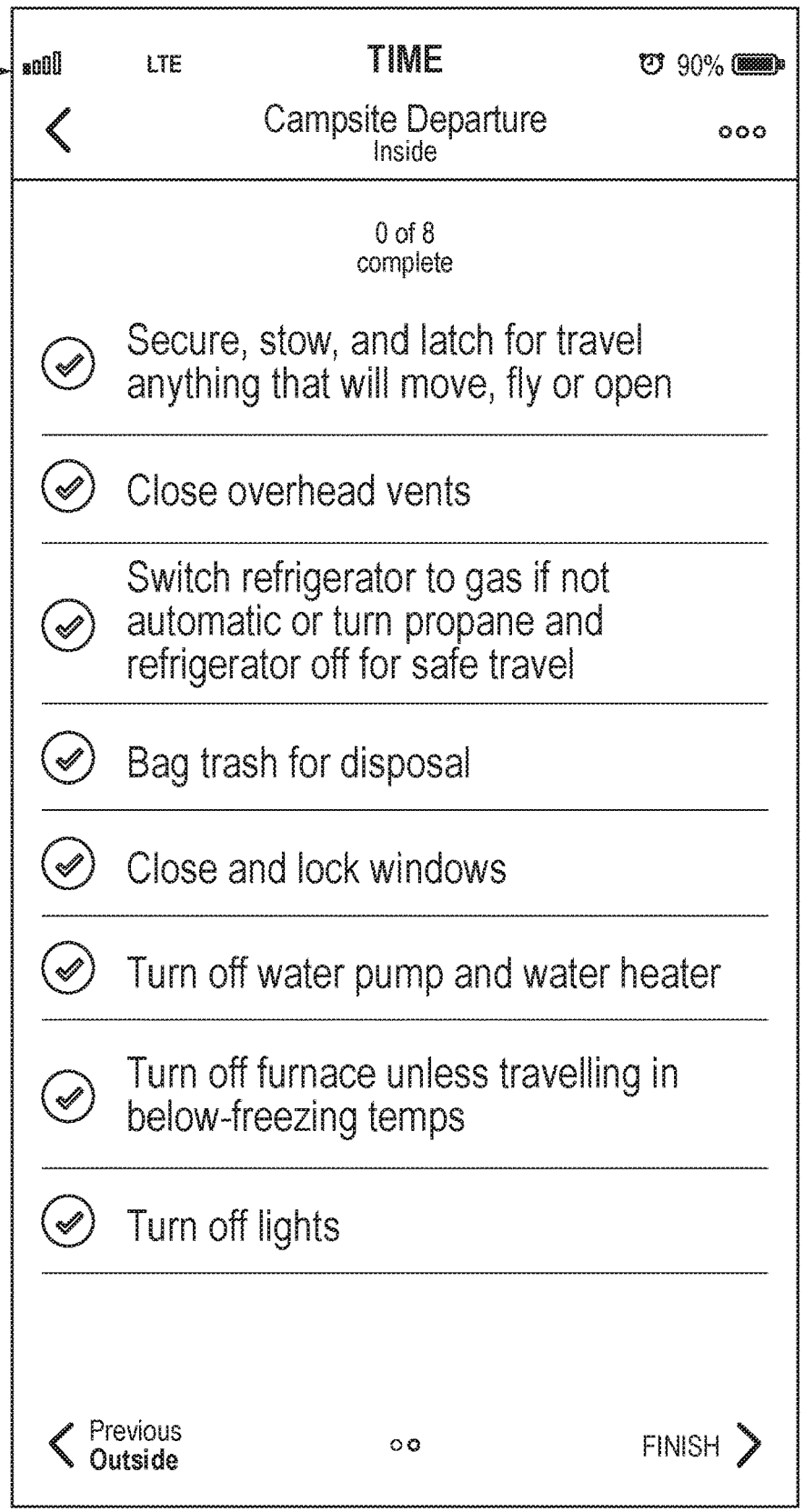
FIG. 12 is a screenshot view on the GUI of the smart vehicle software application tool showing an inside campsite departure preparation checklist accessible through the campsite departure preparation screen of FIG. 10 on the smart mobile device, according to one or more embodiments shown and described herein.

FIG. 12 is a screenshot view on the GUI of the software application tool 106 showing an inside campsite departure checklist screen 194 accessible from an arrow button feature on the bottom of the outside campsite departure checklist screen 192 of FIG. 11 on the smart mobile device 104. The one or more notes of FIG. 12 may be to, for example, secure, stow, and latch for travel anything that will move, fall, fly, or open; close overhead vents; switch refrigerator to gas if not automatic or turn propane and refrigerator off for safe travel; bag trash for disposal; close and lock windows; turn off water pump and water heater; turn off furnace unless traveling in below-freezing temperatures; and turn off lights. The outside campsite departure checklist screen 192 of FIG.

11 may be returned to through an arrow button feature on the bottom of the inside campsite departure checklist screen 194 of FIG. 12.

In an embodiment, a first vehicle property is received, the first vehicle property including a vehicle configuration, a first vehicle feature state indication from the smart vehicle 102, or both. A checklist comprising one or more first tasks is generated based on the first vehicle property and an activity context, and the checklist is displayed at a display of a user interface of the smart mobile device 104. A second vehicle feature state indication is received from the smart vehicle 102, and a modified checklist including a checklist modification is generated. The checklist modification is based on the second vehicle feature state indication. Additionally, the checklist modification comprises an addition to the checklist of one or more second tasks based on the second vehicle feature state indication, a modification of at least one of the one or more first tasks, a removal of at least one of the one or more first tasks, or combinations thereof. The modified checklist is displayed at the display.

The smart vehicle may comprise a plurality of vehicle features, and the first vehicle feature state indication may comprise an indication of a first vehicle feature state of a first vehicle feature of a plurality of vehicle features. In an embodiment, the second vehicle feature state indication comprises an indication of a second vehicle feature state of a second vehicle feature of the plurality of vehicle features. In another embodiment, the second vehicle feature state indication comprises an indication of a second vehicle feature state of the first vehicle feature of the plurality of vehicle features. The plurality of vehicle features may comprise an HVAC system, a vents system, a toilet, a potable water reservoir, a reusable water reservoir, a waste water reservoir, a solar panel, a battery, a lighting system, a security system, a camera system, or combinations thereof, among other possibilities.

In some embodiments, control system 100 (e.g., a user interface controller of the smart mobile device 104) determines whether the second vehicle feature state indication meets at least one servicing threshold. The one or more second tasks comprise a service task to service a vehicle feature associated with the second vehicle feature state indication, and the checklist modification comprises the addition to the checklist of the service task when the vehicle feature state indication meets the at least one servicing threshold. In an embodiment, a vehicle feature is associated with the second vehicle feature state indication and the first vehicle feature state indication. In such an embodiment, generating the checklist may comprise determining whether the first vehicle feature state indication meets at least one servicing threshold, and the one or more first tasks may comprise a task to service the vehicle feature associated with the first vehicle feature state indication when the first vehicle feature state indication meets the at least one servicing threshold. Additionally, generating the modified checklist may comprise determining whether the second vehicle feature state indication meets the at least one servicing threshold, and the checklist modification may comprise the removal of at least one of the one or more first tasks when the first vehicle feature state indication meets the at least one servicing threshold and the second vehicle feature state indication does not meet the at least one servicing threshold. The removal of the at least one of the one or more first tasks may comprise a removal of the task to service the vehicle feature associated with the first vehicle feature state indication. In an embodiment, the one or more first tasks may include a task to service the vehicle feature when the first vehicle feature state indication meets the at least one servicing threshold. A non-transitory computer readable storage may include instructions to determine whether the second vehicle feature state indication meets the at least one servicing threshold or another servicing threshold associated with the activity context.

In an embodiment, a vehicle location of the smart vehicle 102 is determined, and a third vehicle feature state indication (of a state of a vehicle feature of the smart vehicle 102 to service) is received from the IOT controller 110A. Control system 100 (e.g., a user interface controller of the smart mobile device 104) determines whether the third vehicle feature state indication meets at least one servicing threshold. One or more servicing providers suitable to service the vehicle feature are identified based on the state of the vehicle feature to service and the vehicle location when the third vehicle feature state indication meets the at least one servicing threshold, and the one or more servicing providers are displayed with the modified checklist at the display of a user interface of the smart mobile device 104.

The methodologies described herein that occur when the smart vehicle 102 is paired with a user account of the software application tool 106 of the smart mobile device 104 involve an automatic population of the user account with one or more dynamic checklists as described herein after pairing. The downloaded one or more dynamic checklists are based on details specific to the smart vehicle 102 paired with the software application tool 106. Such dynamic checklists include modifiable checklists for departure, arrival, and campsite locations specific to the smart vehicle 102 and a user travel plan, for example. The software application tool 106 may be configured to prepare the smart vehicle 102 for travel as described herein. The software application tool 106 may be configured to service the smart vehicle 102 during travel, such as through searching for and finding service provider locations real-time during travel with functionalities to service the smart vehicle 102, and providing availability and location/proximity information of such service providers. Such service providers may service items of the smart vehicle 102 such as water tanks, batteries, and the like. Thus, the software application tool 106 may be configured to automatically populate one or more dynamic checklists to prepare the smart vehicle 102 for travel and provide servicing information to the smart vehicle 102 during travel such as proximity to service locations, availability of service locations, and respective service functionalities.

Such an automated data control system streamlines and more accurately and effectively adapts digital or data management solutions from a data manager such as the software application tool 106 to the smart vehicle 102 on demand while minimizing dependencies on user involvement and know-how. The user may further utilize the smart mobile device 104 to monitor and control activity of the smart vehicle 102 as described herein.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A smart mobile device comprising a user interface and a user interface controller, wherein:
   the user interface comprises a display;
   the user interface controller is configured to receive vehicle feature state indications from a smart vehicle, the smart vehicle comprising an Internet of Things (TOT) controller, the TOT controller configured to acquire and monitor data from vehicle TOT devices to generate the vehicle feature state indications; and
   the user interface controller comprises a processor and non-transitory computer readable storage comprising instructions that, when executed by the processor, cause the user interface controller to cooperate with the TOT controller and the user interface to
      receive a vehicle configuration and a first vehicle property that comprises a first vehicle feature state indication associated with a first vehicle operational component for the first vehicle property from the smart vehicle,
      receive a context indication via the user interface, the context indication representative of an activity context for the first vehicle property,
      generate a checklist comprising one or more first tasks based on the first vehicle property and the activity context,
      display the checklist at the display,
      receive a second vehicle property that comprises a second vehicle feature state indication associated with a second vehicle operational component for the second vehicle property from the smart vehicle,
      generate a modified checklist including a checklist modification based on the second vehicle property, the checklist modification comprising an addition to the checklist of one or more second tasks based on the second vehicle property, a modification of at least one of the one or more first tasks, a removal of at least one of the one or more first tasks, or combinations thereof, and
      display the modified checklist at the display.

2. The smart mobile device of claim 1, wherein:
   the smart vehicle comprises a plurality of vehicle features, the plurality of vehicle features comprising an HVAC system, a vents system, a toilet, a potable water reservoir, a reusable water reservoir, a waste water reservoir, a solar panel, a battery, a lighting system, a security system, a camera system, or combinations thereof.

3. The smart mobile device of claim 1, wherein:
   the first vehicle feature state indication comprises an indication of a first vehicle feature state of a first vehicle feature of a plurality of vehicle features, and the second vehicle feature state indication comprises an indication of a second vehicle feature state of a second vehicle feature of the plurality of vehicle features.

4. The smart mobile device of claim 1, wherein:
   the first vehicle feature state indication comprises an indication of a first vehicle feature state of a first vehicle feature of a plurality of vehicle features, and the second vehicle feature state indication comprises an indication of a second vehicle feature state of the first vehicle feature of the plurality of vehicle features.

5. The smart mobile device of claim 1, wherein:
   the smart mobile device is communicatively coupled to a cloud network via a communication path that couples the smart device with the cloud network; and
   the instructions to receive the first vehicle property comprise instructions to download the vehicle configuration from a static database stored in the cloud network.

6. The smart mobile device of claim 1, wherein the vehicle configuration comprises a type of the smart vehicle, an indication of one or more vehicle features installed at the smart vehicle, or combinations thereof.

7. The smart mobile device of claim 1, wherein the activity context comprises a trip departure, a campsite arrival, or a campsite departure.

8. The smart mobile device of claim 1, wherein the non-transitory computer readable storage further comprises instructions to enable a user to manually modify the checklist via the display of the user interface.

9. The smart mobile device of claim 1, wherein:
   the checklist and the modified checklist comprise a dynamic and modifiable checklist comprising one or more tasks based on the activity context, the one or more tasks comprising the one or more first tasks, the one or more second tasks, or combinations thereof.

10. The smart mobile device of claim 1, wherein the one or more first tasks comprise a task to service the vehicle feature when the first vehicle feature state indication meets at least one servicing threshold.

11. The smart mobile device of claim 1, wherein the non-transitory computer readable storage further comprises instructions to:
   determine a vehicle location of the smart vehicle;
   receive a third vehicle feature state indication from the TOT controller of a state of a vehicle feature of the smart vehicle to service;
   determine whether the third vehicle feature state indication meets at least one servicing threshold;
   identify one or more servicing providers suitable to service the vehicle feature based on the state of the vehicle feature to service and the vehicle location when the third vehicle feature state indication meets the at least one servicing threshold, the one or more servicing providers located within a predetermined proximity of the vehicle location; and
   display the one or more servicing providers with the modified checklist at the display.

12. The smart mobile device of claim 1, wherein the non-transitory computer readable storage further comprises instructions to determine whether the second vehicle feature state indication meets at least one servicing threshold associated with the activity context.

13. The smart mobile device of claim 1, wherein:
   the non-transitory computer readable storage further comprises instructions to determine whether the second vehicle feature state indication meets at least one servicing threshold;

the one or more second tasks comprise a service task to service a vehicle feature associated with the second vehicle feature state indication; and the checklist modification comprises the addition to the checklist of the service task when the vehicle feature state indication meets the at least one servicing threshold.

14. The smart mobile device of claim 1, wherein
a vehicle feature is associated with the second vehicle feature state indication and the first vehicle feature state indication, the instructions to generate the checklist comprise instructions that cause the user interface controller to determine whether the first vehicle feature state indication meets at least one servicing threshold, the one or more first tasks comprise a task to service the vehicle feature associated with the first vehicle feature state indication when the first vehicle feature state indication meets the at least one servicing threshold, the instructions to generate the modified checklist comprise instructions that cause the user interface controller to determine whether the second vehicle feature state indication meets the least one servicing threshold, the checklist modification comprises the removal of at least one of the one or more first tasks when the first vehicle feature state indication meets the at least one servicing threshold and the second vehicle feature state indication does not meet the at least one servicing threshold, and the removal of the at least one of the one or more first tasks comprises a removal of the task to service the vehicle feature associated with the first vehicle feature state indication.

15. A smart mobile device comprising a user interface and a user interface controller, wherein:
the user interface comprises a display;
the user interface controller is configured to receive vehicle feature state indications from a smart vehicle, the smart vehicle comprising an Internet of Things (IOT) controller, the IOT controller configured to acquire and monitor data from vehicle IOT devices to generate the vehicle feature state indications; and the user interface controller comprises a processor and non-transitory computer readable storage comprising instructions that, when executed by the processor, cause the user interface controller to cooperate with the IOT controller and the user interface to
determine a vehicle location of the smart vehicle,
receive a vehicle feature state indication from the IOT controller of a state of a vehicle feature to service of the smart vehicle, the vehicle feature state indication associated with a vehicle operational component,
determine whether the vehicle feature state indication associated with the vehicle operational component meets at least one servicing threshold, the at least one servicing threshold associated with the vehicle operational component,
identify at least two servicing providers suitable to service the vehicle feature based on the state of the vehicle feature to service and the vehicle location when the vehicle feature state indication meets the at least one servicing threshold, the at least two servicing providers located within a predetermined proximity of the vehicle location, and
display the at least two servicing providers suitable to service the vehicle feature on the display.

16. The smart mobile device of claim 15, wherein the vehicle feature comprises one of an HVAC system, a vents system, a toilet, a potable water reservoir, a reusable water reservoir, a waste water reservoir, a solar panel, a battery, a lighting system, a security system, and a camera system.

17. The smart mobile device of claim 15, wherein:
the at least one servicing threshold comprises a servicing threshold associated with an activity context, and
the instructions to determine whether the vehicle feature state indication meets the at least one servicing threshold comprise instructions to determine whether the vehicle feature state indication meets the servicing threshold associated with the activity context.

18. The smart mobile device of claim 17, wherein:
the instructions further cause the user interface controller to generate a checklist comprising one or more tasks based on the activity context, the one or more tasks comprising a task to service the vehicle feature when the vehicle feature state indication meets the at least one servicing threshold, and
the non-transitory computer readable storage further comprises instructions to display the checklist at the display.

19. A smart mobile device comprising a user interface and a user interface controller, wherein:
the user interface comprises a display;
the user interface controller is configured to receive vehicle feature state indications from a smart vehicle, the smart vehicle comprising an Internet of Things (IOT) controller, the IOT controller configured to acquire and monitor data from vehicle IOT devices to generate the vehicle feature state indications;
the user interface controller comprises a processor and non-transitory computer readable storage having instructions that, when executed by the processor, cause the user interface controller to cooperate with the IOT controller and the user interface to
determine a vehicle location of the smart vehicle,
receive a vehicle feature state indication from the IOT controller of a state of a vehicle feature to service of the smart vehicle, the vehicle feature state indication associated with a vehicle operational component,
determine whether the vehicle feature state indication associated with the vehicle operational component meets at least one servicing threshold, the at least one servicing threshold associated with the vehicle operational component,
identify at least two servicing providers suitable to service the vehicle feature based on the state of the vehicle feature to service and the vehicle location when the vehicle feature state indication meets the at least one servicing threshold associated with an activity context, the at least two servicing providers located within a predetermined proximity of the vehicle location, and
display the at least two servicing providers suitable to service the vehicle feature and the activity context on the display.

20. The smart mobile device of claim 19, wherein:
the instructions further cause the user interface controller to generate a dynamic and modifiable checklist comprising one or more tasks based on the activity context, and
further comprising instructions to display the dynamic and modifiable checklist at the display.

* * * * *